United States Patent Office 3,636,203
Patented Jan. 18, 1972

3,636,203
POULTRY FEED ADDITIVE FOR TREATING FATTY LIVER
Tibor L. Kopjas, Collinsville, Ill., assignor to Ilona Kopjas, executrix of the estate of Tibor L. Kopjas, deceased
No Drawing. Filed Oct. 3, 1968, Ser. No. 764,911
Int. Cl. A61k 27/00
U.S. Cl. 424—195
2 Claims

ABSTRACT OF THE DISCLOSURE

An additive for conventional poultry feed comprising no less than one percent (1%) by weight of said feed of granulated dehydrated garlic, with the latter being intermixed with the mash to regenerate fatty liver caused by a diet high in cholesterol.

BACKGROUND AND SUMMARY OF THE INVENTION

This invention relates in general to poultry feeds and, more particularly, to feeds incorporating garlic as an additive.

Heretofore, garlic, as in powder form, has been utilized in popular medicine on a non-specific basis, such as for promoting digestion, treating of flatulence, and for various gastro-intestinal conditions. Other uses or attempted uses of garlic in the medical field are noted in United States Letters Patent No. 2,642,374. However, the use of garlic as an agent for treating various pathologic conditions of the liver, as well for maintaining same in a state of healthy functioning, has not been heretofore considered.

The present day concern for preventing and, if possible, curing atherosclerosis has caused considerable research to discover the bodily functions producing cholesterol, the depositing of which on the walls of the blood vessels with the development of arterial lesions, cause the atherosclerotic condition. The inducing of experimental atherosclerosis in poultry by a so-called high cholesterol diet is well known. Such diets comprise conventional, commercial poultry feeds having added thereto two percent (2%) by weight of cholesterol in crystal form and five percent (5%) by weight of cotton seed oil. Examination of poultry placed upon such high cholesterol diet after a period of several weeks has revealed the establishment of arterial lesions, which thus confirm the atherosclerotic state. Investigative efforts prior to this invention have not successfully revealed clues to the intervening functions.

In order to establish a therapeutic agent, it was vital to determine the organ or organs that might be involved in cholesterol production in order to effectively thwart the same. A study was conducted of the livers of over four hundred and fifty (450) chickens in a twelve (12) month period, which chickens had been placed upon the aforesaid high cholesterol diet. The macro- and microscopic study of the livers of these chickens consistently disclosed a state of fatty degeneration. The macroscopic study disclosed, even after four weeks of such diet, enlargement, fragility by touch, and a pale yellowishness in color. The microscopic studies demonstrated moderate to heavy portal infiltration. Accordingly, by these efforts, there was concluded that the arterial lesions were accompanied by fatty degeneration of the liver in which the fat discloses itself by accumulation of multiple fine fat droplets in the cytoplasm of the liver cells in the center of the globule in the pattern. Admittedly, physiology of the liver is normally complex. By estimation, said organ effects at least 500 different functions in relation to body metabolism. Much of this complexity undoubtedly stems from the fact of the location in the body of the liver with respect to the portal venous system whereby blood, not only from the gastro-intestinal tract, but also from the spleen, must pass through the sinusoids of the liver before entering the general circulation. The substantial reserve capacity of the liver and its ability to regenerate are well known. Thus, by the experimentation of high cholesterol diets in poultry, fatty changes were effected in the liver. Large accumulations of fat cause serious liver malfunction and related disorders, as well as causing development of cirrhosis of the liver. The present invention contemplates providing an additive to poultry feed for preventing the development of fatty degeneration or to reverse the degenerative condition for restoring a liver to a normal state.

Therefore, it is an object of the present invention to provide an additive for poultry feed for aiding or stimulating the liver in its normal metabolism so as to effectively protect same against degeneration through high fat intake, as well as to promote the regenerative capabilities of the liver in conditions of fat degeneration.

It is another object of the present invention to provide an additive for poultry feed for maintaining and/or promoting the healthful condition of the liver which consists of garlic in a predetermined relationship by weight to the daily food allowance.

It is another object of the present invention to treat atherosclerosis and fatty degeneration of the liver in poultry by a dosage of garlic preferably incorporated in the daily poultry feed.

It is a still further object of the present invention to provide a poultry feed additive for the purposes stated which may be obtained in raw state most economically; which may be prepared for incorporation in poultry feed most inexpensively; and which additive is markedly efficacious.

DESCRIPTION OF THE PREFERRED EMBODIMENT

The present invention contemplates adding garlic to the customary commercial feed for poultry. Feeds of this type, often referred to as mash, contain a wide spectrum of nutrients requisite for health and growth of the poultry, comprising various minerals, vitamins, proteins, and the like. Since feeds of this character are well known, there is no necessity of setting forth formulations therefor since the same do not constitute a part of the present invention. Oftentimes, it is observed that these feeds may vary from the standpoint of the relative contents of any particular character of nutrient whereby, if desired, certain mash may have a relatively greater protein content while others might have a relatively enhanced mineral content, etc.

The garlic to be added to such poultry feed in accordance with the present invention is of granulated, dehydrated form. It has been found preferable to prepare this additive from fresh garlic by well known procedures. Garlic so prepared is then intermixed with the feed, under atmospheric conditions, in an amount which is no less than one percent (1%) by weight of the feed. Poultry feed normally is provided in daily quantities of one (1) kilogram for ten (10) chickens. As will be developed hereinbelow, the garlic content may be increased but it has been found that one percent (1%) by weight of the feed provides the desired efficacy.

However, experiments as developed below have shown that amounts up to five percent (5%) by weight are tolerated without any untoward symptoms by the chickens but such relatively increased amounts do not appear to augment the effectiveness of such additives.

Heretofore, atherosclerosis has been experimentally induced in poultry, for the most part, chickens, by so-called high cholesterol diets, which latter comprise commercial mash having added thereto cholesterol-containing matter, such as saturated oils, for instance, cotton seed oil, as well as crystalline cholesterol. Such diets in a very short time cause the development of arterial lesions and it has now been discovered that poultry so afflicted also have fatty degenerating livers. Accordingly, the condition of the liver indicated a critical connection between the high cholesterol diet and the resultant arterial lesions. It was, therefore, believed that by appropriate treatment of the liver, the lesions may be effectively removed and that by proper adjustment of the diet the development of such lesions could be prevented. To determine the propriety of such assumption, chickens were placed upon a so-called high cholesterol diet consisting of commercial mash having added thereto two percent (2%) by weight of crystalline cholesterol and five percent (5%) of cotton seed oil. After four weeks of such diet the chickens were destroyed and the liver of each carefully studied. Macroscopically these livers showed enlargement, a fragility to touch, and a pale yellowishness. Microscopic study showed moderate to heavy portal infiltration. Thus, all of said characteristics demonstrated a fatty degeneration of the liver. A control group of chickens fed only the commercial mash, that is, without any added cholesterol-containing agents, for the same period of time showed no pathology of the liver after a like period of time.

Then an enlarged group of chickens were fed the aforesaid high cholesterol diet and after four weeks the establishment of fatty liver disorders therein was determined by sampling. This group was divided into first and second smaller groups. The first was then placed upon a regular diet and served as a control group, that is, the same were fed only the commercial grade of feed without any added cholesterol-containing agents. The second group was placed upon a diet which consisted of the regular or commercial mash having added thereto 1 to 5 percent by weight of dehydrated granulated fresh garlic. The total feed daily per ten chickens was approximately 1 kilogram. After ten weeks of such feeding, the chickens in both the first and second group were destroyed and their livers were both macroscopically and microscopically examined. The first group (control) still revealed the effects of the original high cholesterol feeding in that their livers were still of a pale yellowish color although somewhat less pronounced in intensity of yellow color with some enlargement and fragility to touch and with the mirco slides revealing slight to moderate portal infiltration. The limited relatively improved condition of the liver appeared to result totally from the inherent regenerative capacity of the liver.

The second group macroscopically showed no pathological condition as the liver was normal in color, and normal to the tuch, as well as being of appropriate size. The microscopic study showed the liver tissue cells to be normal. The chickens in this second group, on average, were 20 percent heavier than the chickens in the first group. Thie experiment was repeated on numerous occasions and each time with the same results. It may be noted that the high cholesterol diet fed to both groups during the initial stage of this experiment was commenced when the chickens were ten days old.

In other experiments fresh, granulated, dehydrated garlic in an amount of 1 to 5 percent by weight was added to the aforesaid high cholesterol mash and fed to a group of chickens who had been previously placed upon a high cholesterol diet without the garlic additvie. It was also discovered that the addition of the garlic had promoted the regenerative procedure on an average of 25 percent better than in the liver of those chickens which had not been given the garlic additive.

It is to be recognized that although the fatty degeneration of the livers of the experimental chickens was brought about by a cholesterol-inducing diet, it is to be recognized that fatty changes in the liver may be brought about through a variety of causes, such as through chronic severe anemia, exposures to toxic agents, such as chemical poisons, virus bacteria and fungus, as well as by high fat diets. These fatty changes which entail the accumulation of fat upon the liver can bring about serious disorders of that organ.

Although the composition of garlic is relatively complex in that it incorporates various polysulfides such as diallyl disulfide and allylpropyl disulfide, certain volatile oils, as well as the enzyme allisin and others, it is believed that it is the totality of the garlic ingredients which bring about the unusual and unexpected results hereinabove disclosed. Heretofore it has been generally recognized that the diallyl disulfide has been the ingredient responsible for the carminative affect of garlic. But in liver metabolism it is believed that the peculiar composition of garlic with its numerous components produces the desired effects.

Having thus described my invention what I claim and desire to obtain by Letters Patent is:

1. A method of treating poultry to regenerate fatty liver caused by a diet high in cholestoral comprising orally administering to said poultry a poultry feed having added thereto 1 to 5 percent by weight of garlic.

2. The method of treating poultry as defined in claim 1 and further characterized by said garlic being dehydrated, granulated, fresh garlic.

References Cited

Farquhar et al., Circulation, vol. 14, July 1956, p. 77.
Peterson et al., J. of Nutrition, vol. 47, May 1952, pp. 57 to 65.

SAM ROSEN, Primary Examiner